US008556586B2

(12) United States Patent
Williams

(10) Patent No.: US 8,556,586 B2
(45) Date of Patent: Oct. 15, 2013

(54) TURBINE BLADE

(76) Inventor: Herbert Williams, Palatka, FL (US)

( * ) Notice: Subject to any disclaimer, the term of this patent is extended or adjusted under 35 U.S.C. 154(b) by 880 days.

(21) Appl. No.: 12/658,131

(22) Filed: Feb. 3, 2010

(65) Prior Publication Data
US 2011/0189021 A1 Aug. 4, 2011

(51) Int. Cl.
F03D 11/00 (2006.01)
(52) U.S. Cl.
USPC .............. 416/189; 416/230; 416/205
(58) Field of Classification Search
USPC ............ 416/189, 205, 230; 290/44, 55
See application file for complete search history.

(56) References Cited

U.S. PATENT DOCUMENTS

| 2,855,179 A | 10/1958 | Brown |
| 7,399,162 B2 | 7/2008 | Williams |
| 2004/0157519 A1 | 8/2004 | Goodell et al. |
| 2005/0031442 A1 | 2/2005 | Williams |
| 2005/0186081 A1 | 8/2005 | Mohamed |
| 2007/0018460 A1 | 1/2007 | Williams |
| 2007/0166159 A1 | 7/2007 | Williams |

Primary Examiner — Ninh H Nguyen
(74) Attorney, Agent, or Firm — Thomas C. Saitta

(57) ABSTRACT

A fluid turbine for generating electrical power, the turbine having a rotor assembly comprising a hub, a rim and a plurality of blade members joining them together, the blade members being rigid, flat panel, multi-ply, composite blade members having a plurality of parallel, longitudinally-oriented, reinforcing cords composed of non-braided aramid synthetic strands, the cords being disposed between at least two cloth layers impregnated with a cured polymer resin.

17 Claims, 4 Drawing Sheets

TURBINE BLADE

BACKGROUND OF THE INVENTION

The invention relates generally to the field of fluid driven turbines, such as wind turbines or water turbines, wherein electrical power is generated from airflow across rotor blades. More particularly, the invention relates to blades for such turbines wherein the blades extend from a central rotating hub or shaft member to an annular rotating ring or rim member.

Fluid turbines such as wind turbines, also known as windmills, wind generators, wind machines or the like, and water turbines are well known devices for producing energy, typically electrical energy, by harnessing the power of moving fluids—either wind or water. Typical wind turbines used to generate large amounts of energy are very large structures, standing hundreds of feet tall and having rotor blades extending hundreds of feet, the rotor blades being mounted to a central hub or shaft. Large elongated blades are required since the area of blade sweep is proportional to the power that can be produced by a given wind turbine. This size creates a problem, in that each blade must act as a cantilever that can support the elongated blade and the blades must be increasingly massive toward the central hub in order to preclude the blade from breaking during use. Even with the use of high tech composites, carbon fibers and the like, a practical limit has been reached. For example, most large wind turbines have three blades, as this has been found to be the most efficient design. The desire to increase blade length in order to capture more wind is offset by the accompanying reduction in shaft revolutions per minute (rpm). Reduced rpm's require larger reduction gearboxes or larger diameter direct drive generators, both of which are undesirable. Decreasing blade pitch in order to increase the rpm's reduces torque, which is undesirable. In addition, repair or replacement of these giant blades or direct drive generators is difficult and can be extremely expensive. The cost of upkeep and repair reduces the overall benefits of energy production using wind technology. Thus, known wind turbine designs always have to make sacrifices in order to balance these competing factors. Many of these same problems and concerns befall water turbines that harness flowing water, tidal flows or ocean currents.

An alternative type of fluid turbine incorporates an outer, annular ring or rim that is joined to the blades, such that the blade tips are no longer self-supporting and thereby allowing the blades to be longer. The blades extend from the central rotating hub or shaft to the annular rim and are therefore supported at both ends. In this embodiment, it is also known to utilize the rotational energy from the rotating annular rim rather than the central hub, since the annular rim travels at much faster speed. Rollers, wheels, gears, magnets or the like are used to transfer the rotational energy from the rim to one or more generator mechanisms or the like. Examples of such turbines are shown in U.S. Pat. No. 4,319,865 to Richard, U.S. Pat. No. 4,330,714 to Smith, U.S. Pat. No. 4,350,895 to Cook, U.S. Pat. No. 4,545,729 to Storm, U.S. Pat. No. 4,729,716 to Schmidt, and U.S. Pat. No. 6,664,655 to Vann. Such turbines are often of smaller size and, for wind turbines, utilize sails rather than blades in order to increase the number of wind catching elements, since the weight of the annular rim adds structural problems to the design.

It is an object of this invention to provide a new blade construction for a fluid turbine having an annular outer rim that allows desirable structural characteristics to be maximized, such as increased blade length, increased blade durability, increased blade strength, increased blade number, reduced blade weight, lowered cost of materials, increased rpm, increased torque, reduced noise, variable control of blade pitch, and ease of replacement, among others. It is a further object to provide such a blade wherein the blades have sufficient strength such that the blades themselves provide the primary structural support for the annular outer rim of the turbine. Other objects not expressed will be apparent from the disclosure that follows.

SUMMARY OF THE INVENTION

The invention is in general a blade structure for a fluid powered turbine, such as a wind turbine or a water turbine, where fluid flow (air or water) rotates a rotor element about a central shaft or hub member, such that electrical power or the like is generated by the rotational energy, and wherein the rotor element comprises a plurality of blade members extending from the rotating central hub member to a rotating annular rim member. The blade members each comprise a flat panel, multi-ply, composite structure extending from the hub member to the rim member, such that when the wind or flowing water strikes the blades, the rim and hub members rotate. The panel-type blade members do the work of deflection of the fluid while simultaneously providing the main structural support for retention of the annular rim member about the hub member.

The blade members are relatively rigid, flat panel, composite members comprising plural layers or plies of cloth or fabric material impregnated with a cured polymer resin material, such as polyester or epoxy, wherein a plurality of reinforcing cords are encased longitudinally between the mesh cloth layers, the cords being composed of non-braded aramid synthetic (e.g., KEVLAR brand) strands, each cord being composed of several hundred strands.

The blades are mounted to the hub member and the rim member utilizing bracket members are similar mechanical means, either in fixed manner or most preferably in a manner that allows the pitch of each blade to be adjusted relative to fluid flow conditions in order to maximize efficiency by increasing or decreasing rotation speed as required, since optimum efficiency is attained by maintaining rotational speed at or near a fixed rate.

The invention is also a fluid turbine for generating electrical power, the turbine comprising a rotor assembly comprising a rotating central hub member and a rotating annular rim member, the rim member joined to the hub by a plurality of blade members, the blade members being relatively rigid, flat panel, composite members comprising plural layers or plies of mesh cloth material impregnated with a cured polymer resin material, such as polyester or epoxy, wherein a plurality of reinforcing cords are encased longitudinally between the cloth layers, the cords being composed of non-braded aramid synthetic (e.g., KEVLAR brand) strands, each cord being composed of several hundred strands, such that a moving fluid force deflects off the blade members causing rotation of the rotor and annular rim assembly.

DETAILED DESCRIPTION OF THE INVENTION

With reference to the drawings, the invention will now be described in detail with regard for the best mode and the preferred embodiment. In a broad sense, the invention is a fluid powered turbine, such as a wind turbine or a water turbine, where fluid flow rotates a rotor element about a central shaft or hub member such that electrical power or the like is generated by the rotational energy, and wherein the rotor element comprises a plurality of blade members extending from the rotating central hub member to a rotating annular rim member.

A typical turbine comprises a rotor assembly 20 mounted onto a fixed support means, such as a base, tower or similar structure, whereby the rotor assembly 20 is positioned to have a generally horizontal axis of rotation in order to capture wind passing across the ground surface. The turbine may be of any size, and the structure as described herein is suitable for relatively large turbines, wherein the diameter of the rotor assembly 20 may be hundreds of feet.

Figure 1:
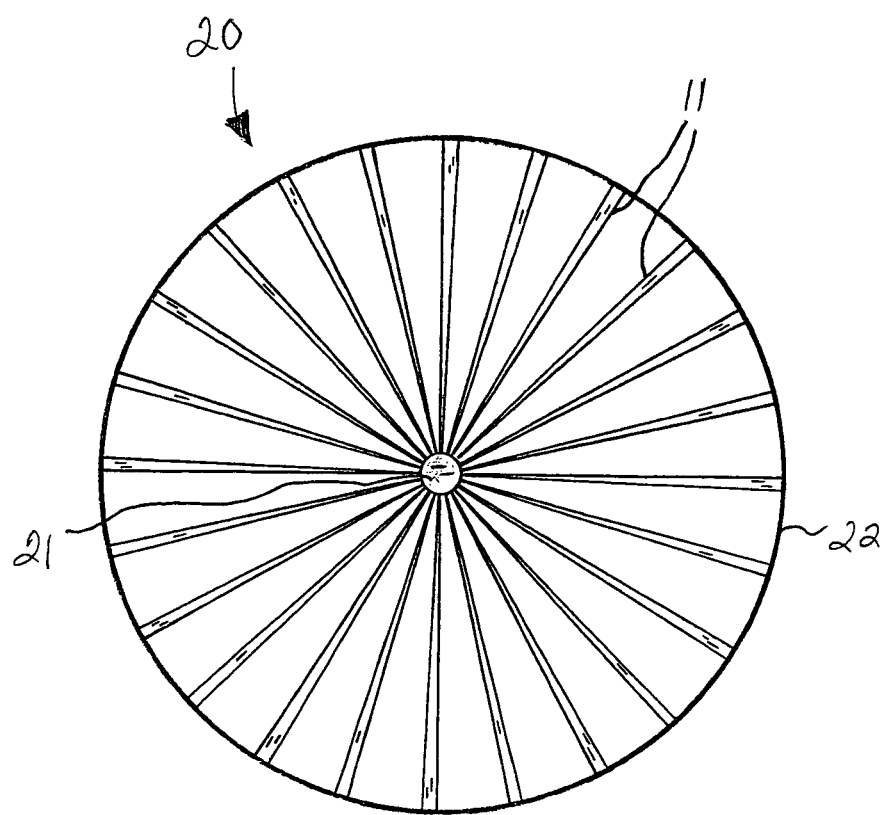
FIG. 1 is a simple illustration of a portion of a fluid turbine consisting of a rotating hub, a rotating annular outer rim and a plurality of blades extending from the hub to the rim.

The rotor assembly 20 comprises a central rotating hub or shaft member 21, which is mounted in suitable manner to a tower or other means of support such that the rotor assembly 20 can rotate relative to the fixed support means. The rotor assembly 20, as shown in FIG. 1, further comprises an outer or peripheral annular ring or rim member 22, with the rim member 22 being joined to the central hub member 21 by a plurality of blade members 10, the blade members 10 being the means to capture the energy of the wind or water flow and translate that energy into rotational movement.

Each blade member 10 is a relatively rigid, flat panel, composite member comprising plural layers or plies of cloth or fabric material 12 and 13 impregnated with a cured polymer resin material, such as polyester or epoxy, wherein a plurality of non-braded reinforcing cords 11 are encased longitudinally between the mesh cloth layers 12 and 13, the cords 11 being composed of a plurality of aramid synthetic (e.g., KEVLAR brand) strands, each cord 11 being composed of at least 100 and preferably several hundred strands. It is important that the cords 11 be non-braded, since the cords 11 provide the resistance to elongation in the longitudinal direction. Minimal elongation is required since the composite blade members 10 are the main, or possibly the only, structural components retaining the annular rim 22 on the hub 21. The cords 11 are preferably positioned in parallel orientation spaced at about one inch intervals, although it is possible to vary the spacing to be greater or smaller dependent on the size of the blade 10.

The composite blade member 10 is formed by disposing a plurality of the spaced cords 11 in parallel between layers of plies of mesh, cloth or fabric material sheets (referred to collectively herein by the generic term "cloth"), such as fiberglass cloth or the like, the cloth sheets being impregnated, either pre-assembly or post-assembly, with a curable polymer resin or epoxy which hardens upon curing. The plies may consist of multiple layers of the same type of cloth, but preferably consist of two types of cloth, one type being a relatively fine mesh cloth member 13 and the other being a multi-directional cloth member 12 having substantially equal elongation in the longitudinal and transverse directions. It is most preferable that for either cloth member 12 or 13 the amount of elongation be relatively minimal.

Figure 2:
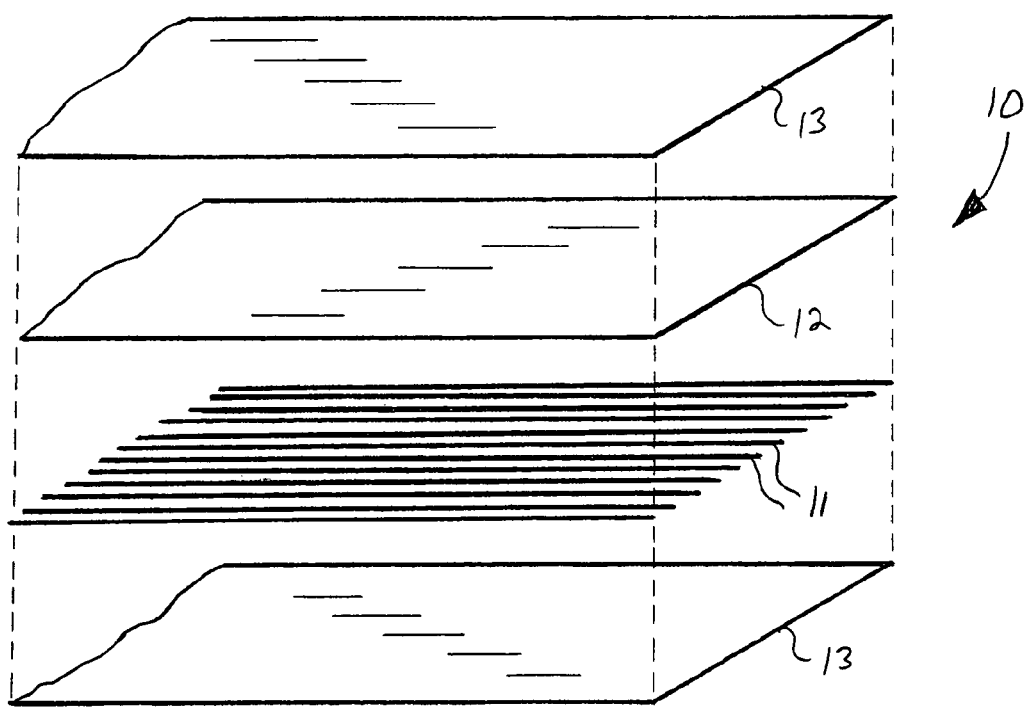
FIG. 2 is an expanded partial view of one embodiment of the blade member, showing a plurality of longitudinally extending aramid synthetic (e.g., KEVLAR brand) cords and a multi-directional cloth layer, both bounded by a pair of fine mesh cloth layers, the assembly impregnated with a curable resin.

The composite blade members 10 may be formed with differing numbers of plies depending on the desired strength or other physical properties of the blade 10. One embodiment is shown in FIG. 2, wherein a composite blade member 10 is composed of a pair of exterior fine mesh cloth members 13 bounding a layer of parallel cords 11 and a single internal multi-directional cloth member 12. The plies are impregnated with a curable polymer resin, such as a polyester or epoxy, and allowed to harden into a relatively rigid, flat panel, composite blade member 10. In the alternative embodiment illustrated in FIG. 3, the parallel cords 11 are disposed between a pair of internal multi-directional cloth members 12, which in turn reside between a pair of exterior fine mesh cloth members 13, again impregnated with the curable polymer resin and hardened. Additional plies, additional layers of cords 11 and alternative arrangements of the cloth members 12 and 13 may also be utilized.

Figure 3:
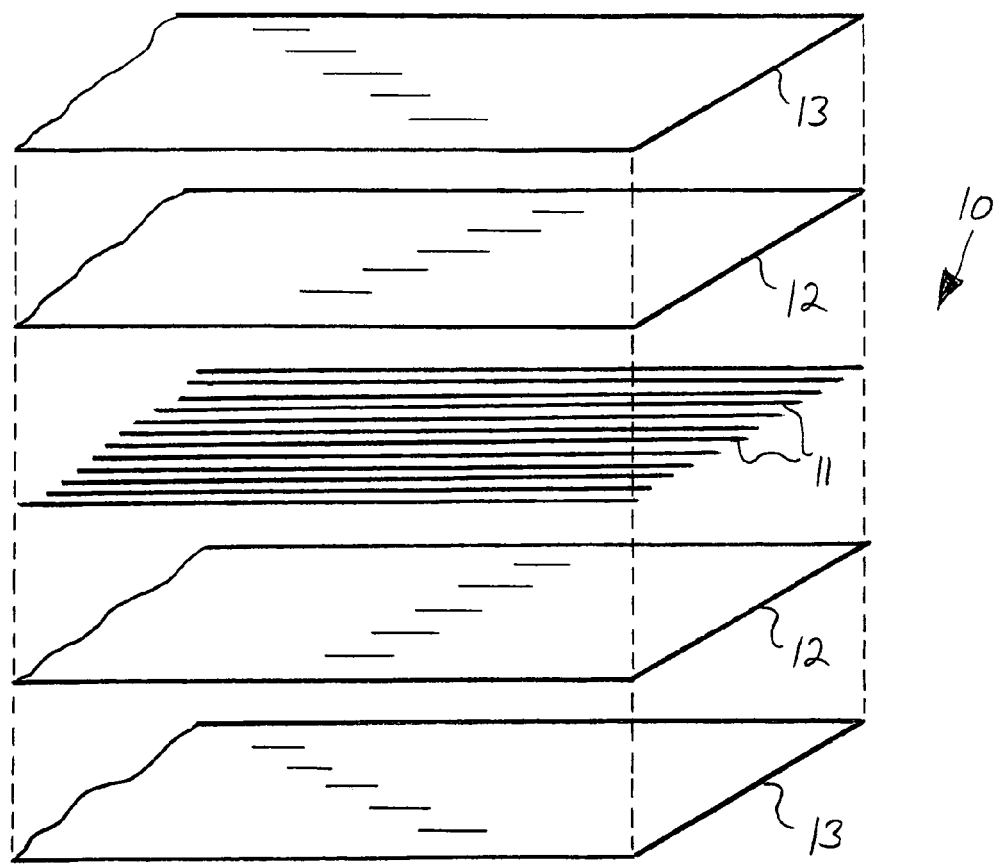
FIG. 3 is an expanded partial view of an alternative embodiment of the blade member, showing a plurality of longitudinally extending aramid synthetic (e.g., KEVLAR brand) cords bounded by a pair of multi-directional cloth layers, all bounded by a pair of fine mesh cloth layers, the assembly impregnated with a curable resin.

The composite blade members 10 may vary in length, width and thickness, with the preferred dimensions of width and thickness being as small as possible to accomplish the necessary functions of structural strength and rigidity so as to minimize total weight. Suitable blade members 10 may range for example from 20 inches or less to 33 inches or greater, with lengths of from 20 feet or less to 40 feet or greater for example, but may be larger or smaller in any dimension. Suitable composite blade members 10 have been constructed having a thickness of approximately ⅛ inches for a blade width of approximately 22 inches and a blade length of approximately 24 feet. This blade 10 weighs only about seventy pounds, as opposed to conventional wind turbine blades that can weight 40,000 pounds. A three inch transverse section of a blade member 10 constructed as shown in FIG. 3 has a deflection of less than one inch under a three pound weight. This rigidity is important as it is most desirable that the composite blade members 10 show relatively little deflection when in use under wind load, and further such that the composite blade members 10 remain substantially linear in the transverse direction throughout the length of the blade 10 when one end of the blade 10 is twisted out of plane so as to create a pitch for better efficiency.

Figure 4:
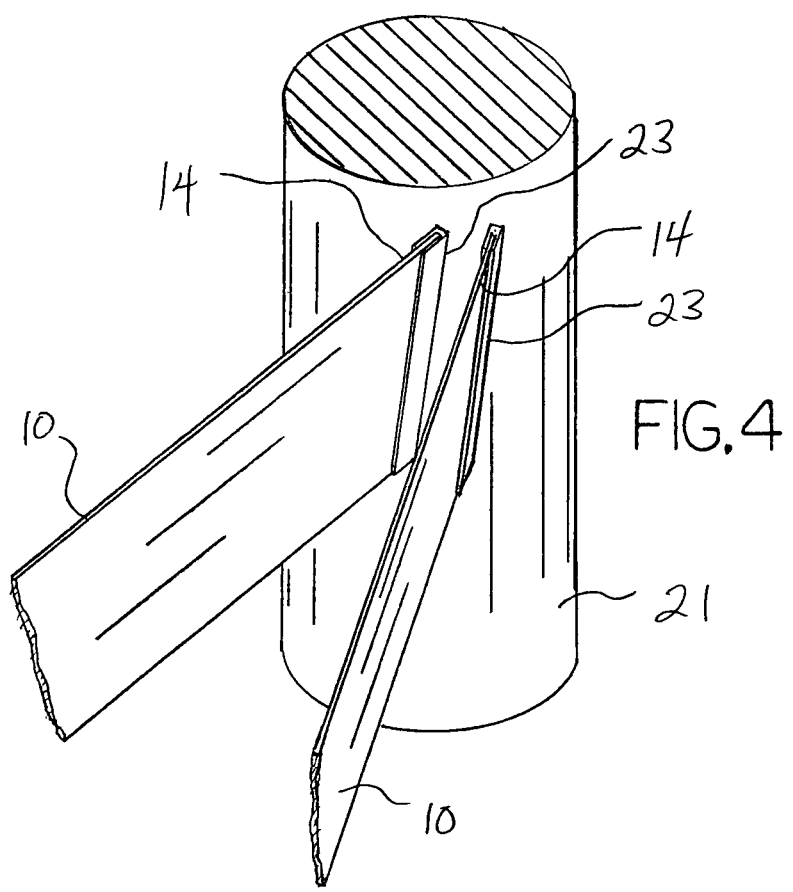
FIG. 4 is a simple illustration showing bracket members connected to the ends of blade members and mounted to the hub in a fixed position.
Figure 5:
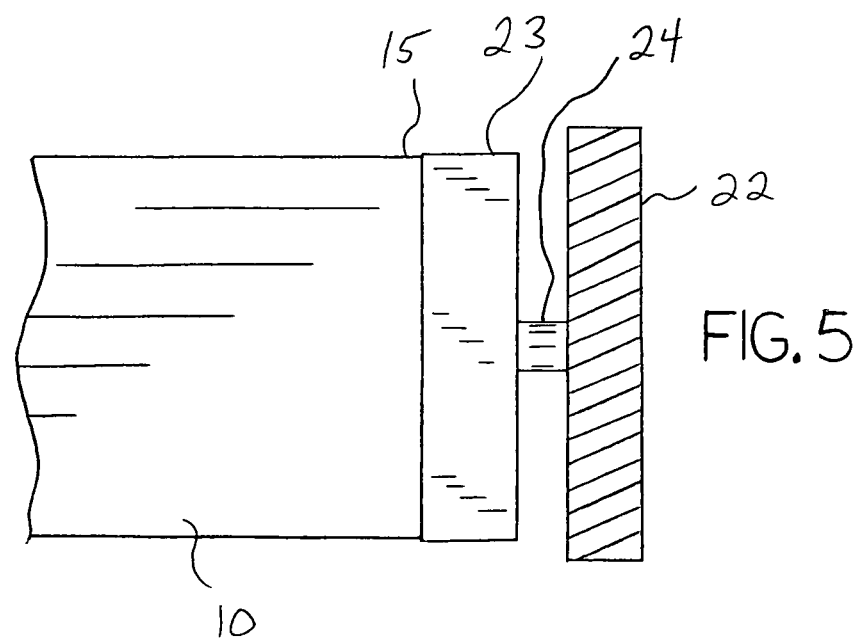
FIG. 5 is a simple illustration showing a blade member mounted to the rim in a manner allowing for pitch adjustment of the blade member.

The composite blade members 10 are mounted to the hub 21 and rim 22 by suitable mechanical means for retaining the blades 10 therebetween. As a representative embodiment shown in FIGS. 4 and 5, mounting brackets 23 may be affixed to the interior and exterior ends 14 and 15 of a blade member 10, the mounting brackets 23 comprising channel members mechanically fastened or otherwise secured to the blade ends 14 and 15. The blades 10 may be joined to the hub 21 and rim 22 in fixed manner or in a manner that allows at least one of the blade ends 14 or 15 to be adjusted so as to alter the pitch of the blade 10. Preferably, as shown in FIG. 4, the interior ends 14 of the blades 10 are mounted to the hub 21 in fixed manner, preferably at an angle of about five to ten degrees off the main hub axis, and the exterior ends 15 are mounted to the rim 22 in a manner that allows the brackets 23 and blade ends 15 to be pivoted, such as about a mounting shaft 24, as shown in FIG. 5.

It is understood that equivalents and substitutions for certain elements set forth above may be obvious to those skilled in the art, and therefore the true scope and definition of the invention is to be as set forth in the following claims.

I claim:

1. A fluid turbine comprising:

a rotor assembly comprising a rotating central hub member and a rotating annular rim member, said rim member joined to said hub member and supported by a plurality of rigid, flat-panel, multi-ply, composite blade members extending between said rim member and said hub member;

said composite blade members comprising a plurality of parallel, longitudinally-oriented, non-braded, reinforcing cords composed of a plurality of aramid synthetic strands, said cords disposed between at least two cloth layers impregnated with a cured polymer resin, wherein at least one of said cloth layers is a multi-directional cloth member having substantially equal elongation in the longitudinal and transverse directions.

2. The fluid turbine of claim 1, wherein each said cord is composed of at least 100 strands.

3. The fluid turbine of claim 1, wherein each said cord is composed of at least 200 strands.

4. The fluid turbine of claim 1, said composite blade members comprising three cloth layers, wherein the interiorly disposed cloth layer is a multi-directional cloth member having substantially equal elongation in the longitudinal and transverse directions.

5. The fluid turbine of claim 1, said composite blade members comprising four cloth layers, wherein the two interiorly disposed cloth layers are each a multi-directional cloth member having substantially equal elongation in the longitudinal and transverse directions, and wherein said cords are disposed between said two interiorly disposed cloth layers.

6. The fluid turbine of claim 1, wherein said composite blade members are mounted to said hub and said rim in a fixed position.

7. The fluid turbine of claim 1, wherein said composite blade members have a thickness of less than approximately 1/8 inches.

8. The fluid turbine of claim 7, wherein said composite blades have a width of at least approximately 20 inches.

9. The fluid turbine of claim 1, wherein said cords are positioned approximately one inch apart.

10. A fluid turbine comprising:

a rotor assembly comprising a rotating central hub member and a rotating annular rim member, said rim member joined to said hub member and supported by a plurality of rigid, flat-panel, multi-ply, composite blade members extending between said rim member and said hub member;

said composite blade members comprising a plurality of parallel, longitudinally-oriented, non-braded, reinforcing cords composed of a plurality of aramid synthetic strands, said cords disposed between at least two cloth layers impregnated with a cured polymer resin, wherein said composite blade members are mounted to said hub in a fixed position and are mounted to said rim in a pivoting manner.

11. The fluid turbine of claim 10, wherein each said cord is composed of at least 100 strands.

12. The fluid turbine of claim 10, wherein each cord is composed of at least 200 strands.

13. The fluid turbine of claim 10, said composite blade members comprising three cloth layers, wherein the interiorly disposed cloth layer is a multi-directional cloth member having substantially equal elongation in the longitudinal and transverse directions.

14. The fluid turbine of claim 10, said composite blade members comprising four cloth layers, wherein the two interiorly disposed cloth layers are each a multi-directional cloth member having substantially equal elongation in the longitudinal and transverse directions, and wherein said cords are disposed between said two interiorly disposed cloth layers.

15. The fluid turbine of claim 10, wherein said composite blade members have a thickness of less than approximately 1/8 inches.

16. The fluid turbine of claim 15, wherein said composite blades have a width of at least approximately 20 inches.

17. The fluid turbine of claim 10, wherein said cords are positioned approximately one inch apart.

* * * * *